(12) United States Patent
Foti et al.

(10) Patent No.: US 6,543,488 B2
(45) Date of Patent: Apr. 8, 2003

(54) FLEXIBLE METAL HOSE

(75) Inventors: Sam J. Foti, Lyndurst, OH (US); Santo Foti, Orange Village, OH (US)

(73) Assignee: Hose Master, Inc., Cleveland, OH (US)

( * ) Notice: Subject to any disclaimer, the term of this patent is extended or adjusted under 35 U.S.C. 154(b) by 0 days.

(21) Appl. No.: 10/159,619

(22) Filed: May 31, 2002

(65) Prior Publication Data

US 2002/0195157 A1 Dec. 26, 2002

Related U.S. Application Data

(60) Provisional application No. 60/299,896, filed on Jun. 21, 2001.

(51) Int. Cl.[7] ................................. F16L 11/16
(52) U.S. Cl. .................. 138/135; 138/136; 138/129
(58) Field of Search .................. 138/135, 136, 138/134, 129, 130, 154, 150

(56) References Cited

U.S. PATENT DOCUMENTS 3,682,203 A    8/1972  Foti et al. .................. 138/135

FOREIGN PATENT DOCUMENTS

| DE | 38 04 105 C | 3/1989 | | |
|---|---|---|---|---|
| EP | 0 523 341 A | 1/1993 | | |
| GB | BR 12482 | * of 1914 | ................. | 138/136 |

* cited by examiner

*Primary Examiner*—Patrick Brinson
(74) *Attorney, Agent, or Firm*—Watts Hoffmann Fisher & Heinke

(57) ABSTRACT

A flexible metal hose formed by a helically wound metal having an "S" shaped cross-section. The strip is provided with projections and recessions, with projections and recessions of adjoining convolutions meshed, enabling hose flexure without unwrapping. First and second resiliently engaged sealing surfaces extend helically along the hose to block leakage via the projections and recessions.

In one embodiment the sealing surfaces are formed on a lip of one convolution and a body portion of the adjoining convolution.

A second embodiment is a "smooth bore" hose having a first helical strip, constructed as described, and a second helical strip with first and second smoothly cylindrical axially spaced radially inner and outer regions. One region forms the smooth bore and the other is resiliently engaged between the radially outer lip of the first strip and the radially outer first strip body portion of the adjoining convolution to form the seal.

7 Claims, 2 Drawing Sheets

FLEXIBLE METAL HOSE

This application claims the benefit of Provisional application Ser. No. 60/299,896, filed Jun. 21, 2001.

FIELD OF THE INVENTION

The present invention relates to hoses and more particularly to flexible metal hosing constructed for transporting fluent substances.

BACKGROUND OF THE INVENTION

Strip-wound flexible metal hosing has long been employed in materials handling applications where noxious gasses or particulate substances must be transported. This type of hosing is also commonly used for handling food products, such as grain, and plastics, where high purity must be maintained, as well as products of combustion. The fluent material is propelled through the hose by differential pressure applied across the length of the hose.

Original continuous ribbon designs inherently possessed significant disadvantages. The interconnecting ribbon edges had a tendency to part or unwrap during periods of stressful use, i.e., severe twisting, flexing, or during initial installation, particularly adjacent any circumferential cut location. Unwinding resulted in product loss, lost production time and repair costs. Further, when a hose wall did separate, a successful, lasting repair was extremely difficult to achieve. For these reasons, secondary reinforcement by the end user became conventional in the art. Reinforcement techniques include wrapping the hose with tape and physically crimping cut surfaces to prevent unwrapping. These steps added time, material expense, and labor cost.

U.S. Pat. No. 3,682,203 to Foti et al. (the '203 patent), which is incorporated herein by reference in its entirety, discloses a flexible metal hose formed from a helically wound metal strip. The edges of adjacent convolutions, or turns, are deformed to interfold slidably so that adjoining convolutions slide axially against one another. This sliding action permits the hose to be flexed, or bent. In one conventional hose of this type, a plurality of mating projections and recessions prevent the sliding surfaces from moving in the helical direction, while allowing sliding in the axial direction when the hose is flexed. Hoses formed in accordance with the '203 patent do not normally need any secondary reinforcement or special handling techniques during installation.

In the hose disclosed by the '203 patent the mating projections and recessions were formed by serration patterns on mating surfaces of adjacent convolutions. Serrations in one surface physically engage serrations in an opposing surface, increasing the force required to unwind the strip in the helical direction while facilitating relative axial movement of the convolutions as the hose was flexed.

When fluent substances were transported through a hose constructed according to the '203 patent, the application of differential pressure was often required to efficiently move the substance. The serrations formed leakage paths to or from the hose, making maintaining differential pressure difficult. The mass flow rate of gaseous or particulate substances decreased to such an extent that the basic hose was modified by sealing the hose interior from the ambient environment. One technique was to line the convolution junctures with a helical bead of packing material to block the leakage paths. Although this technique maintained a seal, the modified hose was costly to manufacture and, for that reason, expensive to purchase.

The present invention provides a new and improved flexible metal hose for use in transporting fluent materials, such as gases and particulate substances, wherein the hose is readily flexed without unwinding the convolutions yet effectively directs the fluent materials therethrough without requiring any packing materials.

SUMMARY OF THE INVENTION

In an illustrated embodiment of the present invention a flexible metal hose for use in transporting fluent substances is provided that is formed from a metal strip generally helically wound about a hose axis. The strip has a generally "S" shaped cross sectional configuration formed by axially spaced radially inner and outer body portions and opposite strip edges forming reversely curved radially outer and inner lips that extend from the respective body portions. The lips of adjacent convolutions are interfitted to provide a first surface on one convolution that undergoes sliding movement relative to a second surface of an adjoining convolution when the hose is flexed. The first and second surfaces have a plurality of projections and recessions that mesh to enable the surfaces to slide relative to each other generally parallel to the hose axis while substantially impeding relative sliding in directions not generally parallel to the hose axis. The first surface is disposed on one convolution lip and the second surface is formed on a body portion of the adjoining convolution. A third smooth surface, formed on the other convolution lip, is biased into sealing engagement with a conforming sealing surface. The sealing engagement between the third and conforming sealing surfaces extends continuously along the hose on a generally helical path for blocking leakage of fluent material between said first and second surfaces.

In one disclosed embodiment of the invention the third surface forms a radially outer face of the other lip and the conforming sealing surface forms a radially inner face of the confronting body portion of the adjoining convolution. The engaged sealing surfaces are interposed between the interior of the hose and the first and second surfaces.

In another embodiment, the flexible metal hose is a "smooth bore" hose in that it includes a second generally helical strip wound with the first strip to provide a relatively smooth interior hose wall. The second strip comprises a first edge region curved about the hose axis and extending along the interior of the hose. A radially inner face of the first edge region forms the inner hose surface. A second edge region extends between adjoining convolutions of the first strip, with the conforming sealing surface formed on one radial face of the second edge region.

In this embodiment, the second edge region of the second strip defines an opposite face that sealingly engages the surrounding body portion of the first strip.

Further features and advantages of the invention will become apparent from the following detailed description of illustrated embodiments made with reference to the accompanying drawings.

BEST MODE CONTEMPLATED FOR CARRYING OUT THE INVENTION

Figure 1:
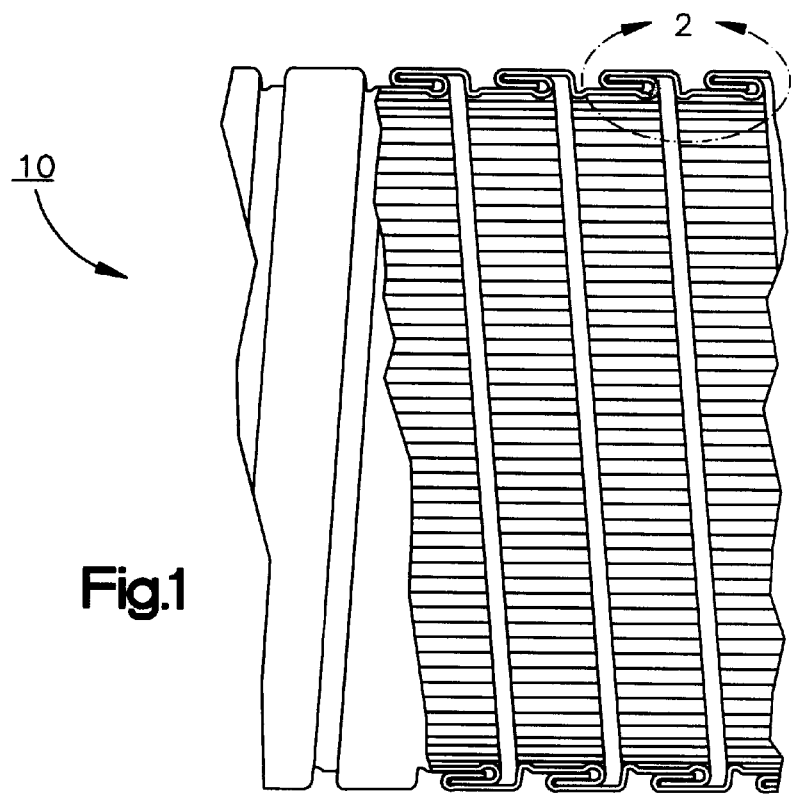
FIG. 1 is an enlarged elevational view, with portions broken way and shown partly in cross section, of a hose constructed according to the present invention.
Figure 2:
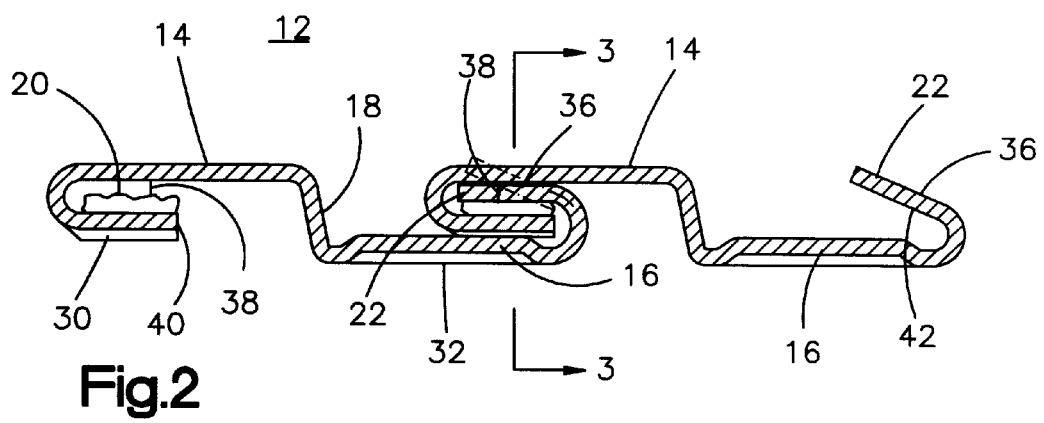
FIG. 2 is an enlarged sectional view of the hose illustrated in FIG. 1, shown within the line 2—2.

A flexible metal hose 10 for use in transporting fluent substances is illustrated by the drawings. Referring to FIGS. 1 and 2, the hose 10 comprises a formed metal strip, or ribbon, 12 that is helically wound with the edges of adjacent convolutions interlocked in such a way that the hose is flexible and substantially gas impermeable. A differential pressure may be established across the length of the hose to create a flow of fluent material axially through it. While the hose 10 may be used to transport any suitable fluent material, it is specially adapted to convey particulate material from place to place.

The hose 10 is formed by passing a flat thin metal strip through forming dies and helically winding the strip on a mandrel with adjacent convolutions interlocked to form a continuous hose. Further details concerning the specific apparatus directed toward the methods of assembly of the flexible metal hose are disclosed in U.S. Pat. No. 3,682,203 to Foti et al., which is incorporated herein by reference in its entirety. The hose may be of any suitable diameter or length. It should be apparent to those skilled in the art that a variety of hose sizes may be manufactured.

The strip is passed through a die and wound on the mandrel to form a generally "S-shaped" ribbon having radially inner and outer body portions 14, 16 that are axially spaced apart and joined by a radially extending transition wall 18, and further including reversely curved radially inner and outer lips 20, 22 that extend from respective body portions to form opposite strip edges. As the strip passes onto the mandrel, the radially inner lip 20 interfits with the radially outer lip 22 of the adjoining convolution, as shown by FIGS. 1 and 2. The strip continues to be wound on the mandrel in this fashion to produce a continuous hose made from interlocked helical convolutions of a single metal strip.

Adjoining convolutions are so constructed and arranged that the hose 10 may be flexed and subjected to twisting forces without unwinding the convolutions. In the illustrated hose 10, the forming dies emboss parallel bands of projections and recessions 30, 32 on the strip 12. In the illustrated hose the projections and recessions are in the form of serrations that extend transversely relative to the strip 12. Serrations 30, 32 of adjoining convolutions are engaged and in mesh when the convolutions are interlocked (See FIG. 3). The illustrated serrations 30, 32 extend axially relative to the hose 10, generally parallel to the hose axis, with each band of serrations forming a helix that extends continuously from one hose end to the other. The serrations of adjoining convolutions mesh so that adjoining convolutions can shift relative to each other in the axial direction—thus allowing the hose 10 to be flexed—but not in the direction of the convolutions, which would otherwise result in the convolutions disengaging and unwrapping.

Figure 3:
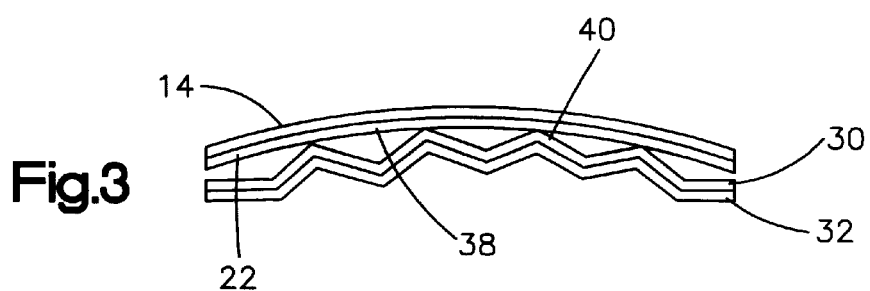
FIG. 3 is a cross sectional view of the hose shown in FIG. 1, seen approximately from the plane indicated by the lines 3—3 of FIG. 2.
Figure 4:
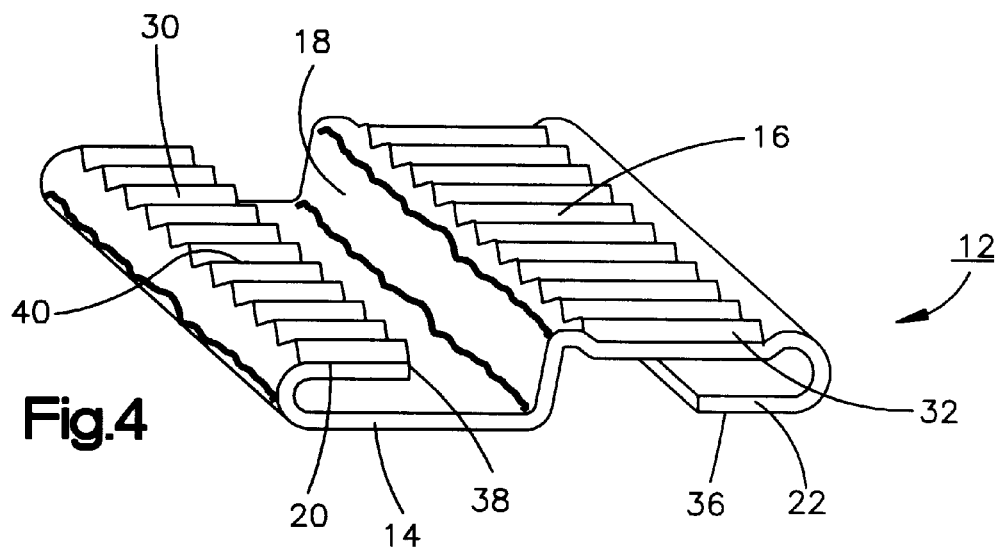
FIG. 4 is an enlarged perspective fragmentary view of a portion of a single helical convolution at the lower side of the hose illustrated in FIG. 1.

In the illustrated hose, the radially inner lip 20 is embossed with the serrations 30 and the radially inner wall portion 16 is embossed with the serrations 32. When the strip 12 is helically wrapped and the lips 20, 22 have been interlocked, the serrations 30 mesh with the serrations 32 along the length of the hose. The strip, or ribbon, 12 is illustrated as quite thin so that the entire wall is upset to form the serrations (FIG. 3). The metal strip may be of any suitable width and thickness. While serrations are illustrated, other forms of interlocking, or meshing, structures could be substituted for the serrations so long as the ability of the hose to flex without unwrapping is preserved.

Although the serrations 30, 32 are in mesh when the hose is in use, they do not fit tightly enough to make the hose gas impermeable, e.g. to prevent leakage of air into, or out of, the hose when a pressure differential is established across the length of the hose. The hose is so constructed and arranged that leakage through the serrations 30, 32 is blocked without requiring the inclusion of an additional packing element. First and second sealingly engaged surfaces extend continuously along the hose on a helical path adjacent the meshed serrations for blocking leakage through the serrations.

In one embodiment of the invention, illustrated by FIGS. 1–4, the sealing surfaces are respectively defined by the radially outer surface 36 of the radially outer lip 22 and the radially inner surface 38 of the radially outer body portion 14. The surfaces 36, 38 are regular and smooth so that when they are urged into engagement their juncture is not gas permeable.

In the illustrated hose 10 the lip 22 is initially formed so that it projects at an acute angle from the cylinder formed by the strip 12, as shown by broken lines at the right hand side of the illustration of FIG. 2. When the strip 12 is wrapped around the mandrel to form a hose convolution, the lip 22 assumes a generally frusto-conical configuration. When the lips 20, 22 of adjacent convolutions are interlocked, the lip 22 is resiliently deformed by engagement with the adjacent body portion 14 so that the surfaces 36, 38 are resiliently urged into engagement, as shown at the central part of the illustration of FIG. 2 and in FIG. 3. The resilient deformation of the edge lip 22 is important because when the hose is flexed, the angularity between the lip 22 and the body portion 14 of the adjacent convolution changes slightly. The lip 22 resiliently follows this change in angularity to maintain the integrity of the seal. The resilient, sealing engagement between the surfaces 36, 38 extends helically throughout the length of the hose 10 and effectively blocks the passage of air or other gas into or from the hose 10 through the serrations 30, 32.

In addition to the resilient engagement forces between the lip 22 and the surface 38, the radially outer periphery 40 of the lip 20 engages the radially inner periphery 42 of the lip 22 when the convolutions are interlocked. The force of engagement between the lips creates additional sealing pressure force on the surfaces 36, 38 that further increases the effectiveness of the seal.

Figure 5:
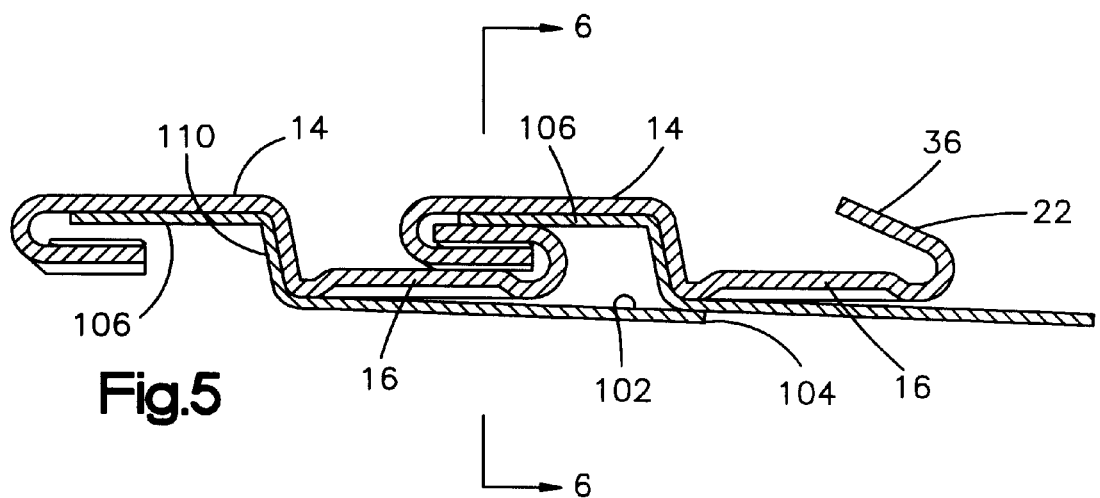
FIG. 5 is a cross sectional view, similar to FIG. 2, of an alternative construction of a hose constructed according to the present invention; and, FIG. 6 is a cross sectional view of the embodiment shown in FIG. 5, seen approximately from the plane indicated by the lines 6—6 of FIG. 5.
Figure 6:
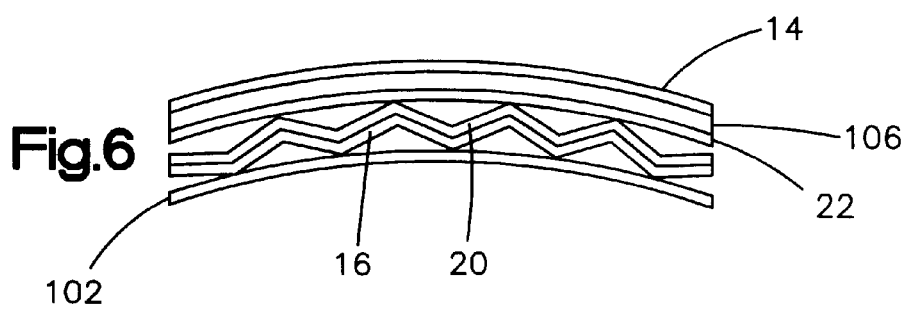

In another illustrated embodiment of the invention, illustrated by FIGS. 5 and 6, a "smooth bore" hose 100 is provided. The hose 100 comprises the strip 12 formed as described above in reference to FIGS. 1–4 and a second strip 102 that is formed and convoluted with the strip 12 to produce a smooth internal bore extending through the hose 100. The second strip 102 comprises first and second radially inner and radially outer body portions 104, 106 that are spaced axially apart and joined by a central generally radial transition portion 110. The body portions 104, 106 are substantially cylindrical with the radially inner portions 104 extending along the inner periphery of the hose 100. The projecting edge of the body portion 104 overlaps the body portion 104 on the adjacent convolution so that a shingle-like effect is created inside the hose 100. The body portion edges project along the interior of the hose in the direction of flow, as indicated by the arrow in FIG. 5. The radially outer body portion 106 extends between the lip 22 and the body portion 14 of the strip 12. The lip 22 thus sealingly engages the radially inner surface 112 of the body portion 106 and forces the body portion 106 into firm sealing engagement with the surface 38 of the body portion 14. Here again, the serrations 30, 32 on the lip 20 engage and urge the lip 22 toward sealing contact with the surface 112 to increase the sealing effectiveness.

The overlapped radially inner body portions 104 on adjacent convolutions are slidable on each other as the hose is flexed. These slidably engaged portions define smooth regular surfaces that form a secondary seal that tends to block flow to the primary seal between the lip 22 and the body portion surface 112. The body portion 106 likewise is smooth and regular and engages the body portion surface 38 to provide a secondary seal between the two.

While two embodiments of the invention have been illustrated and described in considerable detail, the present invention is not to be considered limited to the precise constructions disclosed. Various adaptations, modifications and uses of the invention may occur to those skilled in the art to which the invention relates. It is the intention to cover all such adaptations, modifications and uses falling within the scope or spirit of the annexed claims.

Having described my invention I claim:

1. A flexible metal hose for transporting a fluent substance, the hose formed from a metal strip generally helically wound about a hose axis, said metal strip having a generally "S" shaped cross sectional configuration formed by axially spaced radially inner and outer body portions and opposite strip edges formed by reversely curved radially outer and inner lips that extend from the respective body portions, the lips of adjacent convolutions intermitted to provide a first surface on one convolution that undergoes sliding movement relative to a second surface of an adjoining convolution when said hose is flexed; wherein the improvement comprises a plurality of projections and recessions on said first and second surfaces, said projections and recessions meshing to enable the surfaces to slide relative to each other generally parallel to the hose axis while substantially impeding relative sliding in directions not generally parallel to the hose axis, said first surface disposed on one convolution lip and said second surface formed on a body portion of the adjoining convolution, and a third smooth surface formed on the other convolution lip, said third surface biased into sealing engagement with a conforming sealing surface, the sealing engagement between said third and conforming sealing surfaces extending continuously along the hose on a generally helical path for blocking leakage of fluent material between said first and second surfaces.

2. The hose claimed in claim 1 wherein said first surface forms a radially inner face of said lip and said second surface forms a radially outer face of said body portion of the adjoining convolution.

3. The hose claimed in claim 2 wherein said third surface forms a radially outer face of the other lip and said conforming sealing surface forms a radially inner face of the confronting body portion of the adjoining convolution, said engaged sealing surfaces interposed between the interior of said hose and said first and second surfaces.

4. The hose claimed in claim 3 wherein said hose has a circular cross sectional shape and said third and conforming engaged seal surfaces are substantially cylindrical.

5. The hose claimed in claim 1 wherein said conforming sealing surface is formed on the other body portion of the adjoining convolution.

6. The hose claimed in claim 1 further comprising a second generally helical strip wound with said first strip to provide a relatively smooth interior wall in said hose, said second strip comprising a first edge region curved about said hose axis and extending along the interior of the hose, with a radially inner face of said first edge region forming the inner surface of said hose, and a second edge region extending between adjoining convolutions of said first strip, said conforming sealing surface formed on one radial face of said second edge region.

7. The hose claimed in claim 6 wherein the second edge region of said second strip defines an opposite face that sealingly engages the surrounding body portion of said first strip.

* * * * *